April 12, 1955

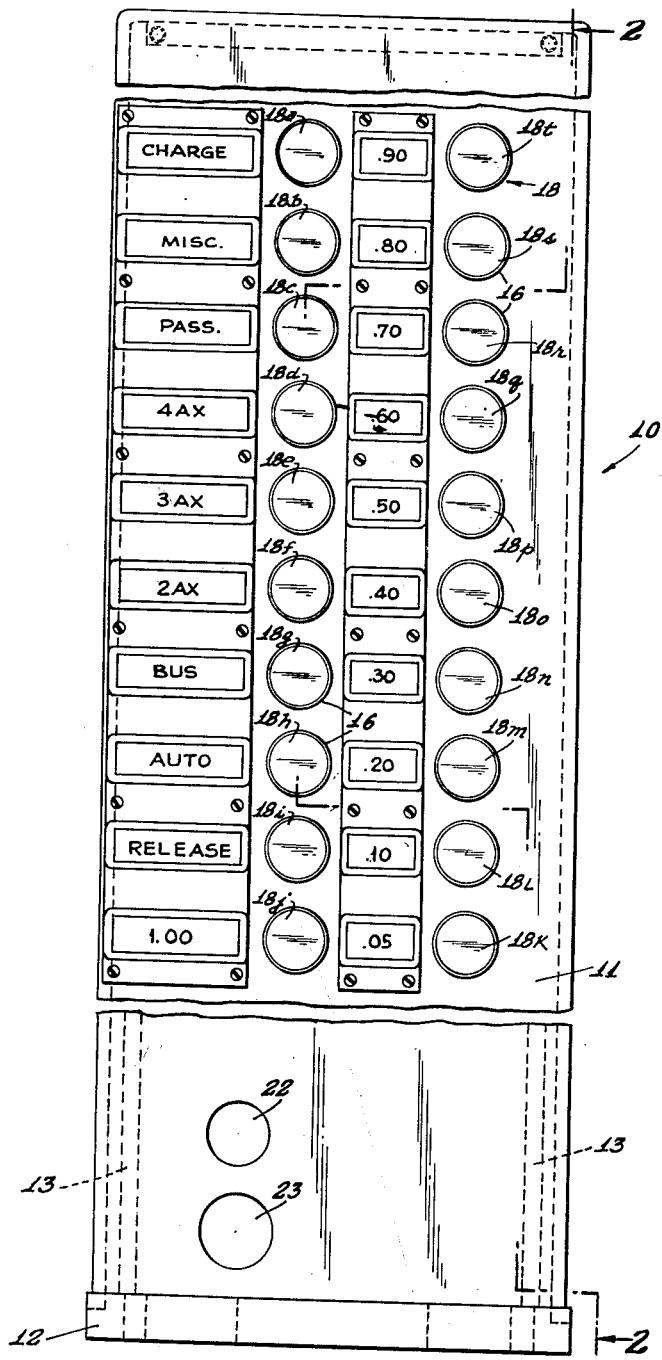
FIG. I.
INVENTORS.
BENJAMIN COOPER
ALBERT HOHMANN
BY
J. B. Felshin
ATTORNEY.

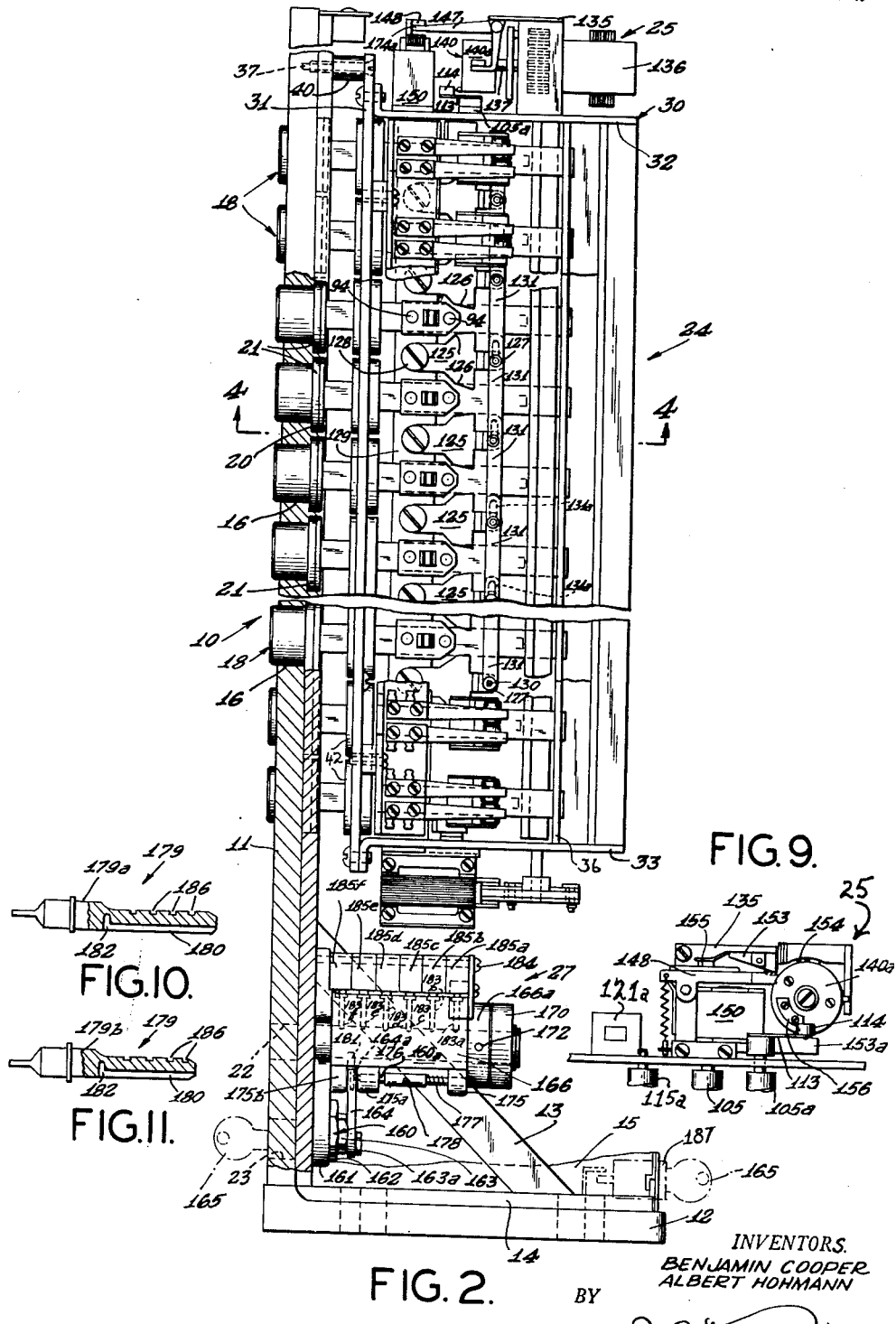

B. COOPER ET AL 2,706,078

TOLL CHECKING SYSTEM

Filed Aug. 23, 1951

INVENTORS.
BENJAMIN COOPER
ALBERT HOHMANN

BY J. B. Felshin

ATTORNEY

April 12, 1955

B. COOPER ET AL 2,706,078

TOLL CHECKING SYSTEM

Filed Aug. 23, 1951

INVENTORS.
BENJAMIN COOPER
ALBERT HOHMANN

BY

J. B. Felshin

ATTORNEY.

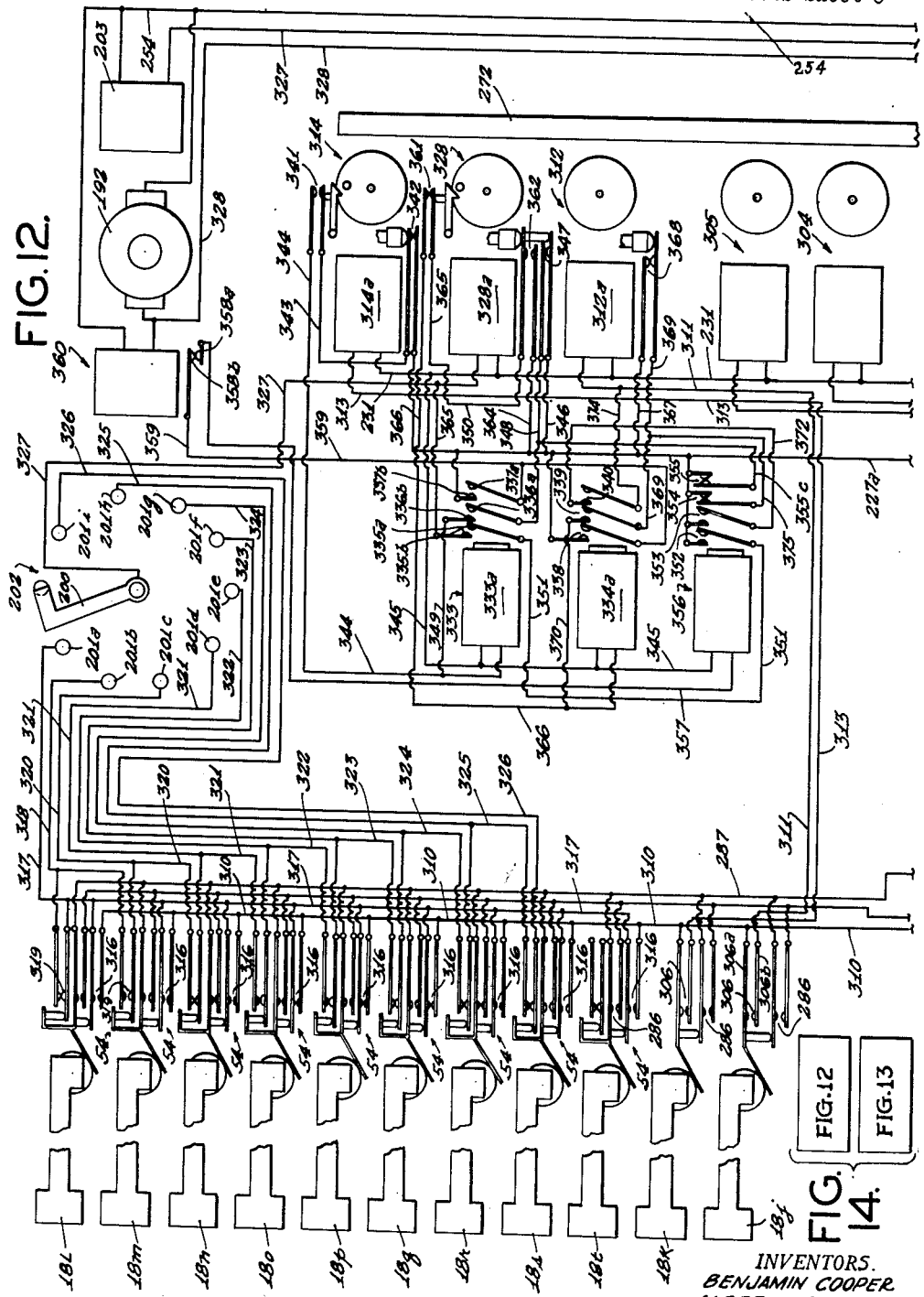

United States Patent Office 2,706,078
Patented Apr. 12, 1955

2,706,078
TOLL CHECKING SYSTEM

Benjamin Cooper, New York, N. Y., and Albert Hohmann, Teaneck, N. J.; said Hohmann assignor to said Cooper Application August 23, 1951, Serial No. 243,252

10 Claims. (Cl. 235—61)

This invention relates generally to toll checking systems and in particular to a toll register for registering data incident to the collection of tolls.

With rising costs of operation and maintenance, many toll roads, bridges and tunnels were required to discontinue conventional fixed fee toll charges and initiate a program of toll charges based on relative size and type of vehicle. As a result thereof, commercial trucking vehicles presented a special problem due to the wide variance in capacity and size and accordingly, an equitable solution resolved in the establishment of toll charges based on the number of axles per vehicle. The existing toll registering apparatus required adaptation to provide for the increased number of differing tolls and in accordance therewith, supplemental apparatus was required to register the increased vehicular classifications. The effort to accurately register the toll revenue introduced burdens upon the toll operators and permitted errors to occur. Further, the operation of multiple registration apparatus increased the time consumed by each toll transaction and resulted in traffic jams.

The present invention provides a toll register of the character described wherein the desired registration apparatus is assembled as a unit having inter-related manual controls that are simple and positive in operation.

Therefore, one object of the invention is to provide in a toll register of the character described, a plurality of toll registering keys each being of a differing denomination; an interlock for said keys to prevent concurrent actuation of two or more keys, a plurality of independently operable keys, each being interlocked to prevent concurrent actuations of two or more of said classificiation keys; a transaction key to register a charge or credit transaction; and related counters associated with the respective keys to register the transactions initiated thereby.

Another object resides in the provision of an accumulator in a toll register of the character described whereby the denomination of any one of the plurality of toll registering keys and denominations of independently operable toll registering keys may be accumulated in a single toll transaction and so registered.

And another object is to provide in a toll register of the character described, a time control for all of said keys whereby a predetermined time period must elapse with each toll transaction.

And still another object is to provide in a toll register of the character described, actuating means operable upon the actuation of any one of said classification keys to register the total denomination of the depressed toll registering keys.

A further object is to provide in a toll register of the character described, a key lock whereby depressed keys are locked in depressed position by a timing device for substantially the entire timing cycle; a key lock release actuable by said timing device to release all depressed keys at the completion of a timing cycle; and a release key operable to release depressed toll registering keys prior to the depression of a classification key.

And another object is to provide in a toll register of the character described, an operator key operated identifier and register lock whereby said register is inoperative unless an identifier key is present and actuated in said register.

Other ancillary objects will in part be obvious and in part hereinafter pointed out.

In the drawings:

Figure 1 is a front elevation of a keybox embodying the invention.

Figure 2 is a side elevation taken in cross-section through the keybox along line 2—2 of Figure 1.

Figure 9 is a front elevation of the timer unit.

Figures 10 and 11 are views illustrating the long and short forms of the identifier key.

Figures 12 and 13 are schematic wiring diagrams of the electrical circuits utilized in the present invention.

Figure 14 is a block diagram showing the assembled relationship of Figures 12 and 13.

Figure 7:
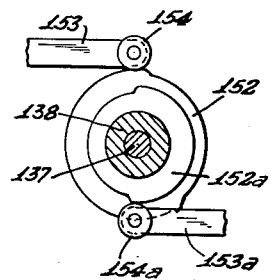
Figure 7 is a fragmentary cross-section of the timer switch control cams.
Figure 8:
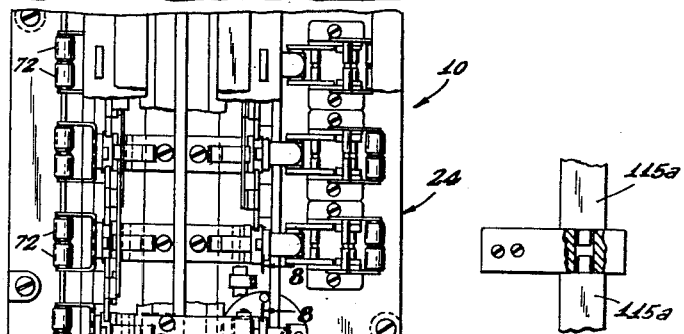
Figure 8 is an enlarged fragmentary view of the mounting structure supporting the split push button locking shafts taken along line 8—8 of Figure 3.

Referring to the drawings in detail, 10 generally designates a keybox embodying the present invention. Keybox 10 comprises a vertical frame wall 11 supported by a horizontal base wall 12 and reinforced by angular braces 13. Walls 11 and 12 are provided with recessed margins 14 to receive the marginal edges of a cover 15 therein. Formed in spaced parallel relation in wall 11 are two vertical rows of concentric through apertures 16 having push buttons 18 disposed therein. Each of the apertures 16 is enlarged at the rear terminal thereof to form a shoulder 20. Radial flanges 21 on said push buttons are arranged to reside in the enlarged openings and abut against shoulders 20. Disposed in the lower portion of wall 11 are through apertures 22, 23 provided for a purpose hereinafter appearing.

Keybox 10 is arranged to receive component units 24, 25, 26 and 27 therein. Unit 24 is a push button switch selector; unit 25 is a timing device; unit 26 is a pulsing device and unit 27 is a key-operated identifier and push-button lock.

Push button selector unit 24 generally comprises an internal frame 30 having a front vertical wall 31 and horizontal upper and lower walls 32, 33 respectively. Interposed between walls 32, 33 are plural vertical spacer rods 34 and 35. Rods 35 have secured to the forward side thereof guide plates 36 that are each perforated with a row of vertically disposed rectangular openings 36a. Vertical wall 31 is secured to frame wall 11, as by screws 37 and spacers 40 and has provided therein plural rows of concentric apertures 41 coaxially disposed relative to push button apertures 16. Secured in apertures 41 are buffer inserts 42 and centrally formed therein are rectangular openings 42a. Openings 42a are disposed in alignment with openings 36a and in each related pair, a push button slide bar 43 or 43a is slidably supported. Each of said slide bars is anchored at one end in a push button 18 thus, manual depression of a push button imparts rearward sliding movement to the related slide bar. When so actuated, push button 18 abuts against buffer insert 42 to limit the rearward movement thereof. Slide bars 43 have pins 45 transversely extending therefrom. Interposed between each pin 45 and a bracket 46 secured, as by rivets 47, to buffer insert 42, is a coil spring 50 that is tensioned to urge said slide bar forwardly to seat push button flange 21 against shoulder 20. Adjacent slide bars 43 is a vertical angle bracket 51 having arm 51a secured, as by screws 52 and spacers 53, to vertical frame wall 31. Arm 51b of bracket 51 is disposed parallel to slide bar 43 and has affixed thereon plural switch groups 54.

Means are provided to actuate a switch group 54 when the related slide bar 43 is actuated by the depression of its associated push button 18. To this end there is secured to each bar 43, a U-shaped member 55 having parallel transversely extending arms 55a and a pair of coaxial rollers 56 rotatably secured therebetween. Rollers 56 are normally disposed in engagement with one contact of each switch in switch groups 54. Therefore, rearward actuation of slide bar 43 releases rollers 56 from engagement with said contacts and actuates the respective switches. Switch groups 54 are provided for a purpose hereinafter appearing.

Mounted on wall 31, parallel to slide bars 43a, as by screws 58, are a plurality of U-shaped members 60 each having parallel horizontal walls 61 and a vertical wall 62. Mounted on the vertical wall 62 of each U-shaped member are plural switch groups 63, each comprising the normally biased to closed position insulated spring fingers, but maintained open when the device is not in operation, in the manner hereinafter appearing.

Means is provided to permit a group of open switches 63 to close when the respective push button is pressed, and to open again when pressure is released from said push button allowing said push button to return to its initial position.

To this end, on the outer surfaces of horizontal walls 61 and near the edges thereof are stud pins 65. Rotatably mounted on said stud pins is a toggle unit 66, comprising a pair of aligned bell cranks 67, having arms 68 and 69, and being interconnected by spacer rods 70 and 71. Rotatably mounted on spacer rod 71 are two insulated rollers 72. Said rollers contact one of the spring fingers of switches 63 holding the spring fingers apart.

Affixed to the inner surface of horizontal walls 61, are stud pins 73. Said stud pins 65, 73 are in vertical planes parallel to front wall 31. Rotatably mounted about stud pins 73 is a toggle unit 74, comprising a pair of aligned bell cranks 75 having arms 76 and 77, and being interconnected by means of spacer rods 78 and 79. Rod 78 is connected to rod 70 by a coil tension spring 80. A roller 81 is rotatably mounted on rod 79 carried by arms 76. Roller 81 is disposed in-between arms 82a of U-shaped member 82 secured to slide bar 43a. Pressing a related push button 18 will thus rotate unit 74 in a clockwise direction as viewed in Figure 4.

By rotating toggle unit 74 in a clockwise direction, spring 80 is rotated in clockwise direction about the rod 70. When spring 80 passes beyond a line interconnecting rods 70 and 78, a pulling force will be exerted on toggle unit 66 urging it to rotate in a counter-clockwise direction. The rotation of a toggle unit 66 will be halted when rod 70 engages the upper margins of horizontal walls 61. The degree of rotation of toggle unit 74 is controlled by the movement of U-shaped number 82.

Upon release of slide bar 43a, push button 18 will return to initial position. Spring 50 exerts a downward pull on toggle unit 74, rotating the same in a counter-clockwise direction until button flange 21 again contacts shoulder 20 in vertical frame wall 11. Spring 80 will be rotated by toggle unit 74, in a counter-clockwise direction about rod 70. When spring 80 passes beyond a line interconnecting rods 70 and 78 force will be exerted on toggle unit 66 rotating it in a clockwise direction until rod 70 contacts the upper margins of horizontal walls 61.

The spring fingers of each switch in a group 63 are normally held out of engagement by the insulated roller 72 on toggle unit 66. By rotation of toggle unit 66 in a counter-clockwise direction upon depressing a push button, said spring fingers are allowed to contact. The return of toggle unit 66 to its initial position will again interpose the insulated rollers between the related spring fingers, opening the contacts.

Each toggle unit 66 is further adapted to actuate a switch latching mechanism to retain normally open switch 83 in closed condition subsequent to the restoring of toggle unit 66 to its initial position. Switch 83 remains latched until a second toggle unit 66 is actuated. Said switch latching mechanism forms no part of the present invention and is completely disclosed in the copending application, Serial Number 125,755, filed Nov. 15, 1949 and now Patent No. 2,622,138.

Secured to the inner sides of the respective slide bars 43, 43a, as by screws 94, are interlock camming members 95 having serrated racks 96 integrally formed on one face thereof. Means are provided to cooperate with racks 96 to retain actuated or depressed push buttons in actuated condition. To this end there are provided a pair of vertical fixed bars 97 secured to the rear of frame wall 11 and interposed between the respective push button slide bars 43, 43a. Secured to bars 97, as by screws 98, are plural bi-furcated members 100. Each member 100 is disposed in the plane of a respective push button slide bar and has interposed tines 101, a pawl 102. Pawls 102 are pivotally secured, as by pins 103, to members 100. Each pawl has affixed thereto, a leaf spring 104, the free terminal of which, is disposed intermediate tines 101 to abut against member 100 and pawl 102. Accordingly, said pawls are urged into engagement with racks 96. Depression of a push button slide bar 43 or 43a causes rack 96 to displace pawl 102 as each tooth on said rack rides thereunder. Thus, pawl 102 normally engages rack 96 to prevent retraction of the respective slide bar 43, 43a by spring 50.

Means are provided to release pawls 102 from racks 96 to enable springs 50 to return all depressed push buttons to normal position. To this end there is provided a pair of vertical rotatable shafts 105 and 105a respectively, of substantially rectangular cross-section, journalled in the respective upper and lower frame walls 32 and 33. Each of said shafts has a longitudinal recess 106 in which projections 102a of pawls 102 reside. Flange 106a accordingly, abuts against said pawl projections.

Push button 18i, designated the Release button, has affixed to the slide bar 43a associated therewith, a bracket 107. Adapted to be engaged by bracket 107 is a roller 108 carried by a lever 110. Lever 110 is affixed to shaft 105. Thus, rearward movement of slide bar 43a and bracket 107 pivots lever 110 and shaft 105 counterclockwise. Flange 106 on shaft 105 engages the related pawl projections 102a and pivots said pawls clockwise out of engagement with any of the depressed racks 96. Slide bars 43, therefore, are free to return to normal position under the influence of springs 50.

Shafts 105 and 105a have affixed thereto, adjacent the upper frame wall 32, meshing pinions 111, 112 respectively. Affixed to the upper terminal of shaft 105a is an arm 113 having a roller 114 journalled thereon. Roller 114 is adapted to be engaged by means hereinafter described, to rotate shaft 105 counter-clockwise and shaft 105a clockwise, as viewed in Figure 4, to release those push buttons held depressed by pawls 102. It will be noted that the slide bar 43a associated with the release button 18i, is not provided with a rack 96, therefore, said button immediately returns to normal position upon the release of manual pressure.

Figure 4:
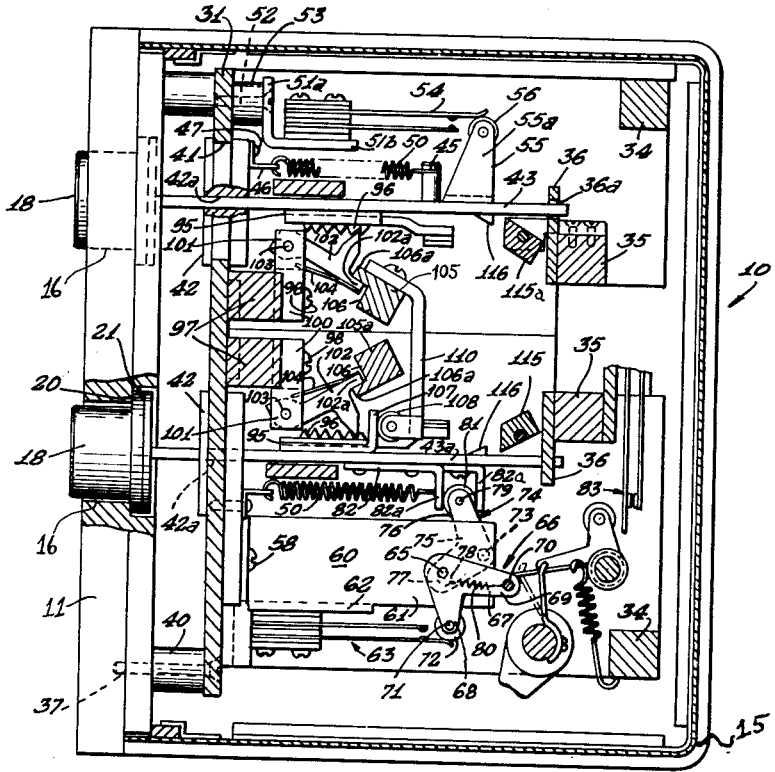
Figure 4 is a bottom view taken in cross-section along line 4—4 of Figure 2.
Figure 5:
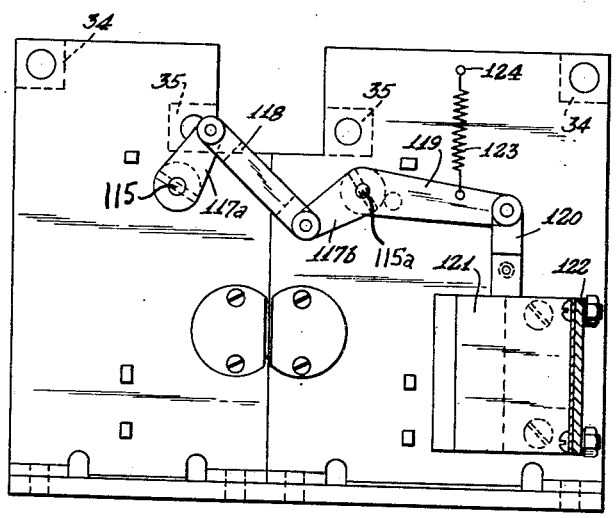
Figure 5 is a bottom view of the lower plate of the push button selector unit frame taken in cross-section along line 5—5 of Figure 3, illustrating the lock bar release mechanism.

Disposed adjacent slide bars 43, 43a and journalled in the upper and lower frame walls 32, 33 are a pair of push button locking shafts 115. Shafts 115, as shown in Figure 4, are disposed to engage projections 116 inwardly extending from slide bars 43 and 43a and prevent rearward movement of said slide bars. Shafts 115 are pivotal from the angular projection engaging position shown in Figure 4, to a position substantially parallel to said slide bars whereby said slide bar projections are not engageable by said shafts. As shown in Figure 5, shafts 115 have secured thereto, arms 117a, 117b respectively. Pivotally secured to the terminals of arms 117a, 117b, is a link 118. Secured to one of said shafts is a second arm 119. Arm 119 is pivotally secured to plunger 120 of solenoid 121 secured to wall 33, as by bracket 122. A spring 123 interposed between arm 119 and a pin 124 affixed to wall 33, urges said arm counter-clockwise to normally position shafts 115 in slide bar locking position. Further, shaft 115a comprises two independently operable coaxially aligned portions with the lower portion adapted for actuation by solenoid 121. The upper portion of shaft 115a is actuable by solenoid 121a affixed to upper frame plate 32. Plunger 120a of solenoid 121a has pivotally secured thereto, an arm 119a which is, in turn, secured to the upper portion of shaft 115a. Thus, energization of solenoid 121a will rotate the upper portion of said shaft from the normal push-button locking position to the unlocked position whereby push buttons 18a through 18h may be depressed. Therefore, only when solenoids 121, 121a are energized, and shafts 115, 115a are rotated to non-locking position, are push buttons 18 depressable. Means hereinafter described is provided to energize solenoids 121, 121a.

Means are provided to prevent the concurrent depression of more than one push button in certain groups of said buttons. As shown in Figure 1, push buttons 18 are further designated as 18a, 18b, 18c, etc. Push button 18a, the Charge button, is independently actuable. Push buttons 18b through 18h are provided with interlocking means that prevent actuation of a second push button while one of said group of push buttons is actuated. Analogously, push buttons 18*l* through 18*t* are provided with interlocking means to prevent concurrent actuation of two or more push buttons in said group. The remaining push buttons 18*j* and 18*k* are independently actuable.

The interlocking means comprises the camming members 95, affixed to the respective slide bars 43 and 43*a*, and coacting pivotally mounted levers 125; Figure 2. Each lever 125 is formed with diametrically opposite wing portions 126 and a laterally extending projection 127. Levers 125 are pivotally secured, as by screws 128, to a pair of spaced vertical bars 129 interposed between and affixed to the upper and lower frame walls 32, and 33. Pivotally secured, as by screws 130, to projection 127 of the lowermost lever 125 of a respective interlocked group, is a link 131. Link 131 is provided with an elongated slot 131*a* adjacent to the upper terminal thereof, and is slidably secured, as by screw 130 passing therethrough, to projection 127 of the next higher lever 125. Analogously, a second link 131 is disposed between the latter lever 125 and the next higher lever 125 of the group. Links 131 interconnect adjacent levers 125 in each group in the hereinbefore described manner.

Levers 125 are so arranged, that actuation of a respective push button causes camming member 95 thereon to displace adjacent levers 125 upwardly and downwardly, respectively. Member 95 cams wing portions 126 of adjacent levers 125 apart and retains said levers in separated condition. The remaining levers 125 cannot be sufficiently separated by a second camming member 95 to permit the latter member and associated slide bar to move rearwardly. Therefore, the proportionate spacing between levers 125 prevents concurrent actuation of two or more push buttons.

Figures 3, 6:
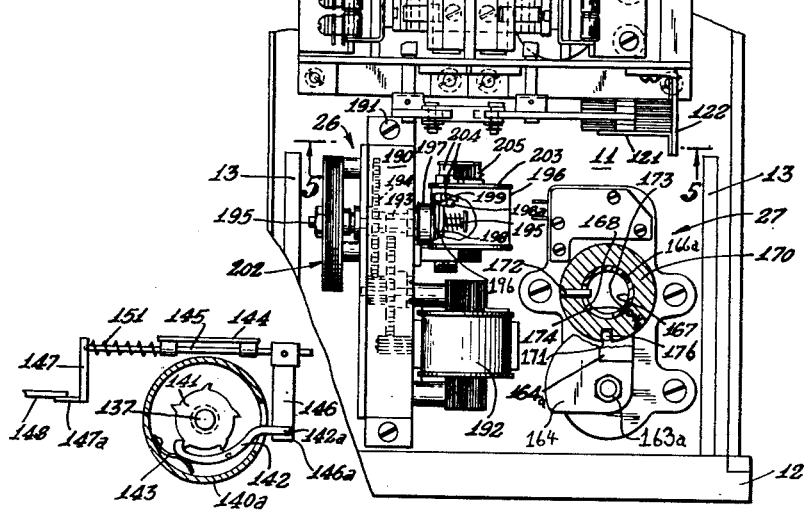
Figure 3 is a rear elevation illustrating the disposition of the various elements within the keybox.
Figure 6 is an enlarged fragmentary detail of the timer unit clutch with the clutch facing cut-away.

Means is provided to retain depressed push buttons 18 in depressed condition for a predetermined period of time to insure registration of the toll data associated with the respective push buttons. To this end there is provided a timing unit 25, comprising a gear reduction box 135 affixed to upper frame wall 32. Secured to the rear side of gear box 135 is an electric motor 136 which is arranged to rotate forwardly extending shaft 137, the forward end of which is secured to clutch casing 140*a* of clutch 140. Secured to the portion of shaft 137 in clutch casing 140*a* is a ratchet wheel 141. Pivotally secured to the inner face of clutch casing 140*a* is a pawl 142 having a portion 142*a* projecting radially from said clutch casing. A leaf spring 143 urges pawl 142 into engagement with ratchet wheel 141. Secured to gear box 135 is a bracket 144 and journalled in said bracket is a shaft 145. Arm 146 affixed to shaft 145 has a projection 146*a* extending, Fig. 6, perpendicularly therefrom. Projection 146*a* is arranged to engage the projecting portion 142*a* of pawl 142, to disengage said pawl from the ratchet wheel 141. Thus, shaft 137 may freely revolve while clutch casing 140*a* and sleeve 138 remain stationary. Secured to shaft 145 is an arm 147 provided with a perpendicularly extending projection 147*a*. Arm projection 147*a* is engageable by armature 148 of solenoid 150. Energization of solenoid 150 by means hereinafter described, attracts armature 148 thereto to rotate arm 147, shaft 145 and arm 146. Projection 146*a* on arm 146 disengages from pawl projection 142*a* permitting said pawl to engage ratchet wheel 141. Accordingly, clutch casing 140*a* rotates with shaft 137. Torsion spring 151 circumjacently disposed on shaft 145 has one end secured to arm 147 and the other end secured to bracket 144, and upon deenergization of solenoid 150, arm 146 is returned by said spring to engage pawl 142 and disengage said pawl from ratchet wheel 141. Solenoid 150 and motor 136 are controlled by means hereinafter appearing to limit clutch casing 140*a* and sleeve 138 to one revolution. Affixed to and rotatable with sleeve 138 are cams 152 and 152*a*. Pivotally secured to gear box 135 is a lever 153 having a follower roller 154 journalled on one end thereof and disposed for peripheral engagement with a biased open micro-switch 155. Cam 152 is so formed that roller 154 resides on a high dwell of cam 152 when clutch 140 is disengaged. Accordingly micro-switch 155 is closed thereby. Micro-switch 155 is arranged to control means hereinafter appearing.

Lever 153*a* having follower roller 154*a* journalled thereon, is pivotally secured to gear box 135 and is adapted to actuate micro-switch 283. Roller 154*a* rides on the periphery of cam 152*a* whereby switch 283 is closed for a limited portion of the cam cycle. Further roller 154*a* resides on the high dwell of cam 152*a* when clutch 140 is disengaged.

As shown in Figure 9, the outer casing 140*a* of clutch 140 has secured thereon, a cam member 156. Engageable by said cam is roller 114 journalled on arm 113 affixed to shaft 105*a*. Cam high dwell 156 is arranged to engage roller 114 substantially near the end of one revolution of clutch casing 140*a*. Therefore, shafts 105 and 105*a* are actuated through roller 114 and arm 115 to release all depressed push buttons.

Thus, it is apparent that all manually depressed push buttons 18 having racks 96 thereon, will remain depressed for a predetermined period of time under the control of timer unit 25.

Unit 27, the key-operated identifier and push button keylock control, provides a means to unlock push button 18 for subsequent operation, electrify keybox 10 and produce a record of identification of the operator using said keybox. Unit 27 comprises a pair of key-receivers 160 and 160*a* mounted in a frame 161. Key-receiver 160 comprises a fixed cylindrical lock barrel 162 disposed in aperture 23 and secured to frame 161 and vertical front frame 11. Rotatable within barrel 162 is a tumbler lock cylinder 163 having a camming segment 164 secured, as by nut 163*a*, to the rear terminal thereof. Cylinder 163 is rotatable by means of a removable key 165, however said key may only be removed when said cylinder is disposed in one of two angular positions.

Key receiver 160*a* comprises a fixed cylindrical barrel 166 formed with a reduced diametrical portion 166*a* and a through concentric bore 167. Portion 166*a* is provided with an arcuate transverse peripheral slot 168 of substantially ninety degree arc communicating with bore 167. Journalled on the periphery of portion 166*a* is a collar 170 having an axial slot 171 formed in the periphery thereof. Secured in a suitable aperture in collar 170 is an inwardly extending radial pin 172 arranged to project through slot 168 into bore 167. Thus collar 170 is retained on portion 166*a* and limited in rotation to the length of slot 168. Collar 170 has provided on the internal periphery thereof, a spring loaded ball bearing 173 arranged to cooperate with a concentric recess 174 formed on the outer periphery of portion 166*a* that function in a well known manner to prevent vibratory rotation of collar 170.

Cylindrical barrel 166 is further provided with plural raised bosses 175, 175*a* and 175*b*. Bosses 175, 175*a* have suitable coaxial apertures therein, in which, a rod 176 is slidably journalled. Circumjacently disposed on rod 176 is a coil spring 177 and a fixed sleeve 178. Rod 176 is of such length as to terminate at one end in alignment with the outer sides of boss 175 and at the other end projects externally of boss 175*a*. Spring 177 and sleeve 178 normally urge rod 176 to project externally of boss 175*a*. Interposed between boss 175*a* and boss 175*b* is camming segment 164. Camming segment 164 has an inclined recess 164*a* formed in one corner thereof, in which the normally projecting terminal portion of rod 176 resides. The rotatable segment 164 is arranged to cam rod 176 rearwardly upon clockwise rotation of key 165. However, rearward movement of rod 176 is stopped by collar 170 except when recess 171 in said collar is positioned in alignment with said rod. When said recess is not aligned with rod 176, segment 164 cannot be rotated since the rod projects into segment recess 164*a*. Therefore, key 165 is not removable unless collar 170 is disposed with recess 171 in alignment with rod 176. Collar 170 is rotatable by means of a special identifier key 179.

Key 179, formed with a peripheral axial groove 180, Figure 10 is insertable in bore 167 for substantially the length thereof whereby pins 172 and 181 enter said grooves. Pin 181 is secured to cylindrical barrel 166 and projects upwardly into bore 167 to prevent the entry of surreptitious keys. Key 179 is further provided with a transverse groove 182 wherein pin 181 may enter upon the rotating of said key. Groove 182 disposed adjacent to the head of said key to insure the complete insertion of the key, prior to the rotating thereof. Pin 172 actuates collar 170 in the hereinbefore described manner.

Disposed in cylinder barrel 166 diametrically opposite to pin 181, are plural spaced plungers 183*a*, 183*b*, 183*c*, 183*d*, 183*e* and 183*f*. Secured to frame 161, as by screws 184, are plural micro-switches 185a, 185b, 185c, 185d, 185e, and 185f, each being disposed in operative alignment with the respective plungers 183a, etc. Switches 185a through 185e, inclusive, are of the normally open type and switch 185f, is of the type having a pair of fixed contacts and a swinging contact alternately engageable therewith. Switches 185a through 185e are adapted to be closed by plungers 183 upon the rotating of key 179. Switch 185f, is actuable by the insertion of key 179 in bore 167. To selectively actuate predetermined combinations of switches 185a, 185b, 185c, and 185d, keys 179 are discriminately provided with transverse grooves 186 in which plungers 183 may enter upon the rotating of said key. In this manner, those plungers 183 entering said grooves are not actuated while the remaining plungers not having grooves 186 to enter, are actuated and the respective switches closed thereby. Accordingly, each operator is issued an individually differing key 179 having differing combinations of grooves 186 which actuates an individual combination of switches 185. The actuated switches control means, hereinafter described, that effectively identifies the particular key and consequently the operator using said key.

It will be noted that key 179 is provided in two forms, Figs. 10, 11, i. e.; a long form 179a and a short form 179b. The long form key 179a is arranged to actuate collar 170 to permit the removal of key 165 while the short form key 179b cannot reach pin 172, and therefore, cannot actuate collar 170. Key 179a is provided for maintenance use only, whereby key 165 may be removed and inserted in cover keylock 187 to permit the removal of cover 15. Keys 179b do not permit removal of key 165, therefore, the unauthorized toll operators cannot remove cover 15 to gain access to keybox 10.

Micro switches 185e and 185f are known as the key-insert switch and the key-turn switch, respectively. Micro switches 185e and 185f are provided to control means hereinafter described for unlocking push buttons 18 and preparing keybox 10 for operation.

Pulsing unit 26, comprises a gear box 190 affixed to vertical frame wall 11, as by screws 191. An electric motor 192 mounted on gear box 190 is arranged to drive a sleeve 193 by means of gear train 194. Sleeve 193, journalled on shaft 195 extends jointly therewith through one side of gear box 190. Coupling sleeve 193 to shaft 195, is a clutch mechanism 196 comprising, a clutch plate collar 197 affixed to sleeve 193, a spring loaded clutch plate 198 affixed to shaft 195 and a cork disc 199 disposed therebetween. Secured to the end of shaft 195 extending through the other side of gear box 190, is a rotary switch contact 200 disposed for wiping engagement with fixed contacts 201 of switch assembly 202, secured to the gearbox. Thus, rotation of sleeve 193 by motor 192 will, through said clutch mechanism, rotate shaft 195 and contact 200 one complete revolution.

A solenoid 203 mounted on gear box 190 has its armature 204 arranged to engage a dog 198a radially extending from clutch plate 198 to hold said plate against rotation. Energization of solenoid 203 actuates armature 204 to release plate 198 for rotation. The energization of said solenoid is momentary, therefore, spring 205 urges armature 204 into the path of travel of dog 198a before clutch plate 198 has completed one revolution. Thus, contact 200 wipes across fixed contacts 201 in stepping relation. As shown in Figure 12, the wiping action of contact 200 with contacts 201 pulses counting means hereinafter described.

Figure 13:
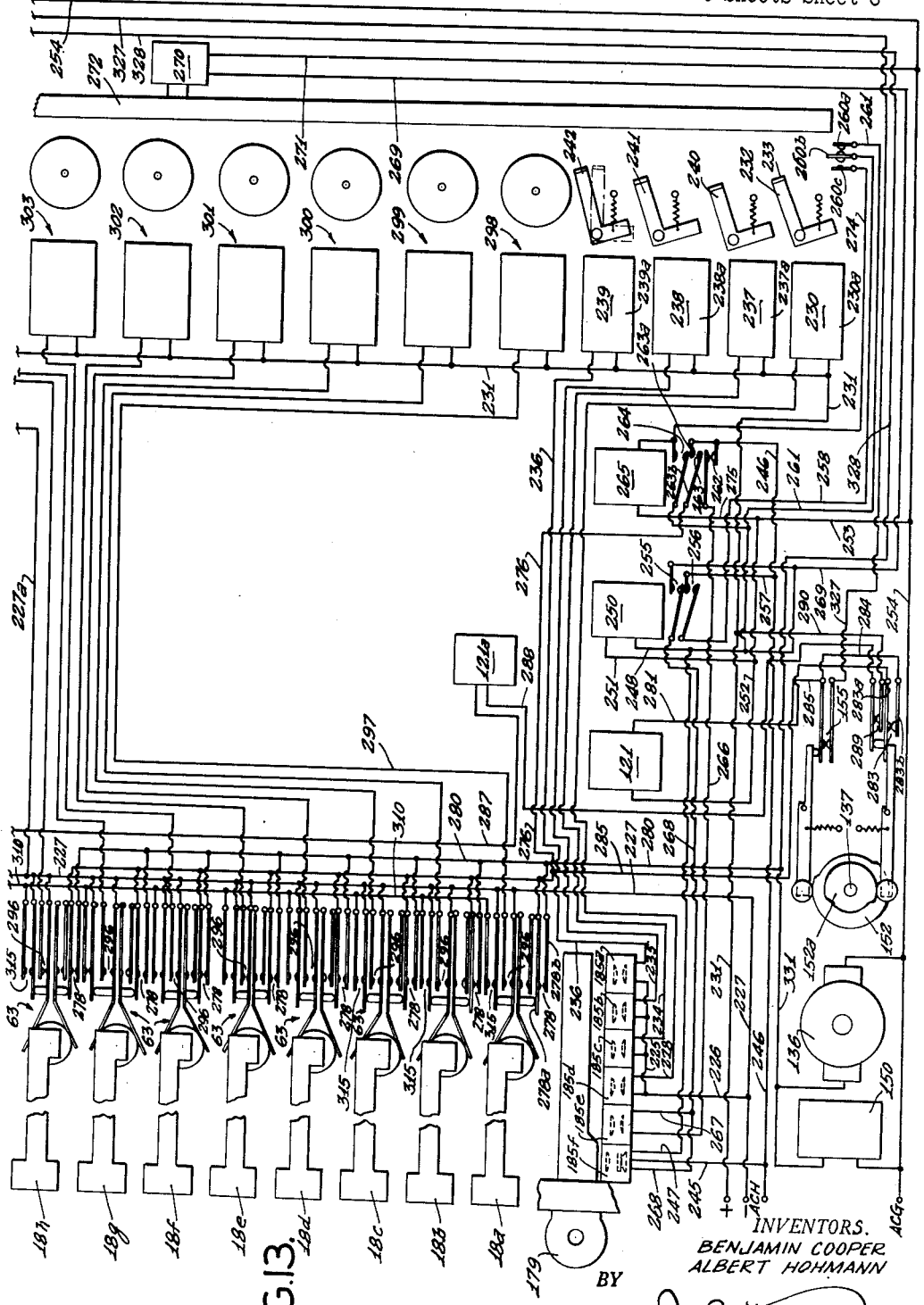

Referring to Figures 12 and 13, there is shown a schematic wiring diagram including an identifier circuit. Said circuit includes micro switches 185a, 185b, 185c, 185d, each having one contact commonly connected, as by conductors 225, 226 to negative buss 227.

The other contact of micro-switch 185d is connected by conductor 228 to one terminal of coil 230a of identifier solenoid 230. The other terminal of said coil is connected to the positive buss 231, therefore, actuation of switch 185d energizes coil 230a and attracts printing slug 232 thereto. Slug 232 is provided with indicia 233 on one end thereof that is displaceable from an angular non-printing position, to a perpendicular, indicia printing position.

Micro-switches 185a, 185b, 185c are similarly connected by conductors 234, 235 and 236 to coils 237a, 238a and 239a of identifier solenoids 237, 238 and 239, respectively. Armatures 240, 241 and 242 associated therewith are similarly operable to position printing slugs into or out of printing position. Thus, various combinations of said identifier solenoids may be energized to effect printing of differing combinations of indicia. As hereinbefore described, keys 179 are discriminately provided with transverse grooves in which plungers 183a, 183b, 183c or 183d may enter upon the turning of said key. The use of key 179, therefore, produces a record of the user of said key.

Upon insertion of key 179 in the bore of key receiver 160a, plunger 183f is depressed by said key. Plunger 183f when depressed, moves the swinging contact from engagement with the uppermost contact to engagement with the lowermost contact of micro-switch 185f. The swinging contact of micro-switch 185f is connected, as by conductor 245 to ACH buss 246. The lowermost contact of micro-switch 185f is connected by conductors 247, 248 to one terminal of the coil of print relay 250. The other terminal of said coil is connected by conductors 251, 252, 253 to ACG 254. Thus when print relay 250 is energized and normally open switches 255, 256 associated therewith are closed, a holding circuit is established for relay 250 which may be traced as follows: from ACH, conductor 257, through closed switch 256, conductor 258, swinging contact 260b and fixed contact 260a of switch 260, conductor 261, conductor 248, to the coil of print relay 250. Upon rotating key 179, micro-switch 185e is closed and a circuit is established from ACH, through normally closed contacts 262 associated with keybox power relay 265, conductor 266, through micro-switch 185e, conductors 267, 268, the now closed printing relay switch 255, conductor 269 to one terminal of print solenoid 270. The other terminal of print solenoid 270 is connected, as by conductor 271, to ACG. Thus, print solenoid 270 is energized and printing platen 272 is actuated to a printing position. Printing platen 272 when actuated, moves swinging contact 260b of switch 260 from engagement with contact 260a into engagement with contact 260c. Contact 260c is connected by conductor 274 to one terminal of the coil of keybox power relay 265. The other terminal of the keybox power relay coil is connected by conductors 275, 253 to ACG. Thus, keybox power relay 265 is energized and normally open switches 263, 264 associated therewith are closed and the normally closed switch 262 is opened. Switch contacts 263a of switch 263 is connected to ACH buss 246 and when relay 265 is energized, switch 263 applies ACH to push button unit 24. Contact 263b is connected by conductor 276 to contacts 278a of switches 278 in the respective switch groups 63. Contacts 278b are connected in parallel relation to common conductor 280. Accordingly, depression of any one of the push buttons 18a through 18h will close the respective switch 278 and in so doing apply ACH potential to common conductor 280.

Concurrently with the energization of keybox power relay 265, a circuit is established that energizes push button lock solenoid 121. This circuit may be traced as follows: from ACG buss 254, over conductors 253, 252 to one terminal of solenoid 121. The other terminal of solenoid 121 is connected by conductor 281 to contact 283a of normally closed switch 283. Contact 283b is connected by conductors 284, 285, 276, closed switch 263 to ACH buss 246. The energizing of push button lock solenoid 121 actuates shaft 115 and the lower portion of shaft 115a to their respective ineffective positions whereby push buttons 18j through 18t may be actuated.

Means are provided to prevent actuation of any one of the push buttons in the group 18a through 18h until at least one of the push buttons in the group 18j through 18t has been actuated. Associated with each of the push buttons 18j through 18t is a normally open switch 286 having one terminal thereof connected, as by conductor 287 to the coil of lock solenoid 121a. The other terminal of the coil solenoid 121a is connected by conductor 288 to one contact of normally closed switch 289. The other contact of switch 289 is connected by conductor 290 to the positive buss 231. The other contact of each switch 286 is connected to negative buss 227. Accordingly, when one of the push buttons in the group 18j through 18t is depressed the switch 286 associated therewith is closed and solenoid 121a is energized. Solenoid 121a when energized rotates slide locking shaft 115a out of the path of travel of slide bar projections 116, thus, allowing any one of the push buttons in the group 18a through 18h to be depressed. Switch 283 is provided for a purpose hereinafter appearing.

Keybox 10 is now conditioned for the registration of toll transactions.

Means are provided to count each actuation of the classification push buttons 18a through 18h. To this end there is a circuit including an electro-magnetically operable counter, associated with each of said push buttons. A normally open switch 296 is provided in each switch group 63 and is actuable to a closed position upon depression or actuation of the respective push button. Switch 296 associated with push button 18a completes a circuit from negative buss 227, through closed switch 296, over conductor 297 to one terminal of coil 298a of counter 298. The other terminal of coil 298a is connected by common conductor 231 to the source of positive potential. Accordingly, electromagnetic counter 298 is actuated to register a count. Counter 298 performs in a manner well-known in the art and therefore is not described in detail.

Switches 296 associated with each of the respective push buttons 18b through 18h, are connected by similar circuits to the respective counters 299, 300, 301, 302, 303, 304, and 305 and upon each actuation thereof a count is recorded.

Means are provided to totalize and accumulate monetary values of collected tolls and to this end there is provided Amount push buttons 18j through 18t. Associated with push buttons 18k and 18j are normally open switches 306 adapted to close upon actuation of the respective push button. Push button 18j has assigned thereto, the monetary value of one dollar and is independently actuable irrespective of the remaining push buttons. Analogously, push button 18k is independently actuable and has assigned thereto the monetary value of five cents. The remainder of the group, namely 18l through and including 18t, have the monetary values of ten cents through ninety cents assigned thereto in increasing increments of ten cents. Thus, in the present embodiment of the invention the arbitrarily assigned monetary values permit the recording of a single toll transaction up to and including one dollar and ninety-five cents.

Switch 306 associated with push button 18j has contact 306a thereof connected to a common conductor 310. Contact 306b of contact 306 is connected by conductor 311 to one terminal of coil 312a hundreds counter 312. The other terminal of coil 312a is connected to positive buss 231. Actuation of push button 18j accordingly prepares a circuit for energizing counter 312. Actuation of push button 18k closes switch 306 associated therewith to prepare a circuit as follows: from common conductor 310, through switch 306, over conductor 313 to one terminal of coil 314a of units counter 314. Push buttons 18a through 18h have associated therewith in the sets of switches 63, a plurality of switches 315. Switches 315 are disposed in parallel relation with one contact of each connected to common conductor 310 and the other contact connected to negative buss 227. Therefore, actuation of any one of the group of push buttons 18a through 18h applies negative potential to common conductor 310 and through closed switch 306, the respective units or hundreds counter is energized to record a count of related value. Push buttons 18l through 18t have associated therewith switch groups 54. A switch 316 in each set has one terminal connected to a common conductor 317 which is, in turn, connected to fixed contact 201a of pulser unit 202. The other contacts of switches 316 are connected in parallel relation to common conductor 310. Contact 201b of pulser 202 is connected by conductor 318 to one terminal of the normally closed switches 319 associated with push buttons 18l and 18m. The other contact of switch 319 associated with push button 18l is connected to common conductor 317. Accordingly, when push button 18m is actuated, negative potential will still remain on contacts, 201a and 201b of the pulser unit. Contact 201c is connected by conductor 320 to the other contact of switch 319 associated with push button 18m and to one contact of switch 319 associated with push button 18n. Contact 201d is connected by conductor 321 to the other contact of switch 319 associated with 18n and to one contact of switch 319 associated with push button 18o. Contact 201e is connected by conductor 322 to the other contact of switch 319 associated with push button 18o, and to one contact of the switch 319 associated with push button 18p. Contact 201f, connected by conductor 323 to the other contact of switch 319 associated with push button 18p and to one contact of switch 319 associated with push button 18q. Contact 201g is connected by conductor 324 to the other contact of switch 319 associated with push button 18q and to one contact of switch 319 associated with push button 18r. Contact 201h is connected by conductor 325 to the other contact of switch 319 associated with push button 18r and to one contact of switch 319 associated with push buttons 18s. Contact 201i is connected by conductor 326 to the other contact of switch 319 associated with push button 18s. Rotating contact 200 of pulser unit 202 is connected by conductor 327 to one terminal of coil 328a of tens counter 328. The other terminal of coil 328a is connected to positive buss 231.

Accordingly, actuation of one of the push buttons 18l through 18t interrupts the supply of negative potential to the respective contacts 201. For example, should the push button 18p be depressed, switch 319 associated therewith will be opened and the negative potential will be cut-off from fixed contact 201f and consequently only contacts 201a, 201b, 201c, 201d, and 201e have negative potential thereon. Therefore, rotation of contact 200 by motor 192 intermittently applies negative voltage thereto when said contact engages fixed contacts 201a, 201b, 201c, 201d, and 201e. Accordingly, tens counter 328 is pulsed intermittently and a count of fifty is recorded.

Pulser motor 192 is controlled by a solenoid 203 that is in turn controlled by switch 155 associated with timer unit cam 152 through a circuit traced from ACH buss 246, closed contacts 263 of keybox power relay 265, conductors 276, 285 to one contact of switch 155, through said switch when actuated and over conductor 327 to one terminal of release magnet 203 and motor 192. The other terminal of release magnet 203 is connected to ACG buss 254. The other terminal of motor 192 is connected by conductors 328, 280, a closed switch 278 to the hot ACH conductor 276. Switch 155 is closed for substantially one-half second by the high-dwell of cam 152 which releases clutch 196, and rotary contact 200 for rotation with motor 192.

Timer unit motor 136 and the timer motor clutch magnet 150 are concurrently energized upon the actuation of any one of the push buttons 18a through 18h. The energizing circuit may be traced from ACG buss 254 to one terminal of the coil of magnet 150 and to one terminal of the motor 136. The other terminal of magnet 150 and motor 136 is connected by conductors 331, 280, through a closed switch 278 to the hot ACH conductor 276. Accordingly, the energization of magnet 150 releases clutch 140 for rotation with shaft 137 of motor 136. Cam member 156 on clutch casing 140a, as hereinbefore described, actuates shafts 105 and 105a after substantially three hundred and thirty degrees of rotation of said clutch casing. Therefore, the depressed push button of the group 18a through 18h is released and the switch 278 associated therewith is opened. The opening of switch 278 accordingly, cuts off the supply of ACH potential to magnet 150 and motor 136. Arm 146 of the clutch mechanism returns to engage pawl 142. Motor 136, while deenergized continues to rotate thereby rotating clutch 140 until it is arrested at its initial position. Cam 152 rotatable with clutch casing 140a controls switch 155 to close said switch for substantially a fraction of one revolution of said cam. As hereinbefore described, switch 155 controls pulser motor release magnet 203. Therefore, pulser unit 202 performs in the prescribed manner prior to the release of any depressed push button.

To prevent actuation of the independently actuable push buttons 18j or 18k after a cycle of operation has been initiated by the depression of a classification push button, push button lock solenoids 121, 121a are energized to actuate shafts 115, 115a to their respective slide bar locking positions. Solenoids 121 and 121a are controlled by switches 283, 289, respectively, which are in turn, controlled by cam 152a secured to timer clutch sleeve 138. Upon cam 152a rotating, switches 283 and 289 are opened and solenoids 121, 121a deenergize. As hereinbefore set forth, deenergization of solenoids 121, 121a, locks all push buttons 18 against actuation. Switches 283 and 289 reclose upon the completion of one revolution of clutch 140 to reenergize said solenoids. Push buttons 18, therefore, are now depressible for the succeeding cycle of toll registration.

Means are provided to carryover units to tens and tens to hundreds. Said means comprises a units storage relay 333 and a tens storage relay 334. Associated with relay 333 are normally open switches 335, 336 and 337 adapted to close upon energization of said relay. Associated with tens storage relay 334 are normally open switches 338, 339 and 340 adapted to close upon energization of said relay.

Units counter 314 has associated therewith a normally open switch 341 adapted to close on every second unit count. Each unit count represents a value of five. Also associated with counter 314 is a normally open switch 342 adapted to close with each energization of said counter. A circuit including switches 341 and 342 energizes unit storage relay 333. This circuit may be traced as follows: from negative buss 227, conductor 227a to contact 342a of switch 342, through said switch and from contact 342b thereof, over conductor 343, to contact 341a of switch 341. Contact 341b is connected by conductor 344 to the negative terminal of coil 333a of unit storage relay 333. The positive terminal of coil 333a is connected by conductor 345 to positive buss 231. Accordingly, deenergization of counter 314 closes switch 341 after the count of five has been recorded therein. The second or alternate count of five on counter 314 closes switch 342 prior to the release of switch 341 thereby energizing unit storage 333. Switches 335, 336, 337 associated therewith are moved from the normally open position to a closed position. A holding circuit established for units storage relay 333 exists from negative buss 227a, over conductor 346, through normally closed switch 347 associated with tens counter 328, through said switch and over conductor 348 to contact 336a of switch 336. Switch 336 is closed by the energizing of units storage relay 333. Contact 336b is connected by conductors 349, 344 to coil 333a thereby providing a source of negative potential. A parallel holding circuit is established from negative buss 227a, through normally closed contacts 355a and 355b associated with release relay 356, over conductors 355c, 346, closed switch 336, conductors 349, 344 to the negative terminal of units storage relay 333. The closure of switch 335 by relay 333 prepares a circuit from the negative terminal of coil 328a of counter 328, over conductors 327, 350 to contact 335b of switch 335, through closed switch 335 and from contact 335a over conductor 351, to contact 352a of the normally open switch 352. Switches 352, 353, 354 and 355 are associated with storage release relay 356. Contact 352b is connected to negative buss 227a.

Tens counter 328 is energizable to register the units counter carryover upon switch 352 closing by the energizing of release relay 356. The coil of relay 356 has one terminal thereof connected, as by conductor 345, to the positive buss 231. The other terminal of said coil is connected by conductor 357 to contact 358a of a normally closed switch 358 associated with overhead indicator release relay 360. Contact 358b is connected by conductor 359 to contact 337a of switch 337, associated with unit storage relay 333. Contact 337b is connected to negative buss 227a. Thus, with switches 337 and 358 in closed position, the tens counter 328 is energized to count the carryover from counter 314. However, overhead release relay 360 is concurrently energizable with totalizer motor 192 therefore, switch 358 is held open for the period that push buttons 18 are held depressed. Accordingly, at the completion of a cycle and upon the release of push buttons 18, overhead release relay 360 deenergizes and completes the circuit energizing storage release relay 356. Concurrently with the energizing of storage release relay 356, switch 355 opens and at the same time, switch 347 associated with tens counter 328 opens since said counter is energized, thereby opening the holding circuits to unit storage relay 333. Switch 337 accordingly opens and storage release relay 356 deenergizes. Keybox 10 is now conditioned for the registration of the succeeding toll.

Assuming that a toll amounting to one dollar and ninety cents is to be registered, push buttons 18j and 18t are depressed and followed by the button representative of the vehicle classification in the group 18a through 18h. Push button 18j energizes hundreds counter 312 to record a count of one hundred and concurrently therewith, totalizer motor 192 energizes and steps rotary contact 202 to pulse tens counter 328 nine times or a count of ninety. Further, assuming this toll to be the initial toll registered by keybox 10 and the succeeding toll amounts to fifty cents, then push button 18p will be depressed followed by one of the group 18a through 18h. Accordingly, tens counter 328 will be pulsed five times and in so doing will close switch 361 after the first pulse. On the second pulse, switch 362 associated with tens counter 328 will also close to complete a circuit to energize tens storage relay 334. This circuit may be traced as follows: from negative buss 227a, over conductor 364 to contact 362a of switch 352, through said switch and from contact 362b over conductor 365, to contact 361a of switch 361. Contact 361b is connected by conductor 366 to one terminal of tens storage relay 334. The other terminal of tens storage relay 334 is connected by conductor 345 to positive buss 231. The holding circuit established by the energization of tens storage relay 334 is from negative buss 227a, over conductor 367 to contact 368b of switch 368 associated with hundreds counter 312, through said switch and from contact 368b, over conductor 369 to contact 339a of switch 339 associated with storage relay 334. Contact 339b is connected by conductors 370, 366 to the negative terminal of the coil of tens storage relay 334.

A parallel holding circuit exists from negative buss 227a through normally closed switch 354 associated with release relay 356, over conductors 375, 369, through closed switch 339, and over conductors 370, 366, to the negative terminal of coil 334a of tens storage relay 334.

Tens counter 328 continues to count the balance of the impulses produced by pulser 202. After the release of push buttons 18, storage release relay 356 is energized in the hereinbefore described manner to complete a circuit to hundreds counter 312. This circuit is as follows: from negative buss 227a, through the now closed switch 353, over conductor 372 to the now closed switch 340, through said switch and over conductor 374 to the negative side of coil 312a of hundreds counter 312.

Switch 354 is accordingly opened, therefore, switch 368, when opened by the energization of counter 312, interrupts the holding circuit for tens storage relay 334, thereby deenergizing said relay and permitting switches 338, 339 and 340 to return to their respective open positions. Switch 338 opens the energizing circuit for release relay 356 and said relay deenergizes. The switches associated therewith likewise return to normal in preparation for the succeeding toll registration cycle.

With the removal of key 179 identifier solenoids 230, 237, 238 and 239 are deenergized and a print of the zero settings is made. Key insert switch 185f controls a circuit that energizes solenoid 270 to make a print. This circuit may be traced from ACH 246, over conductor 245, through the swinging contact and the uppermost contact of switch 185f, over conductor 268, through closed contacts 255 associated with print relay 250, over conductor 269 to the coil of print solenoid 270. The other terminal of print solenoid 270 is connected by conductor 271 to ACG buss 254. Thus, platen 272 is actuated to make a print and the hereinbefore described switch 260 is actuated by platen 272. Contact 260b of switch 260 is moved from engagement with contact 268 to engagement with contact 260c. During the period of movement of contact 260b wherein said contact is out of engagement with both 260a and 260c, the holding circuits for keybox power relay 265, print relay 250 and push button lock solenoids 121, 121a, are interrupted thus deactuating said relays to inactivate the entire keybox 10.

Each toll collector prior to going on duty is issued by supervisory personnel an identifier key 179b and a record of such issuance is maintained. The toll operator upon entering a toll booth inserts key 179b in aperture 22 and rotates said key substantially ninety degrees. The identification on said key correspondingly actuates the related identification printing solenoids to position the related printing slugs 240, 241, 242 and 232 in the related printing or nonprinting position. Simultaneously therewith print solenoid 270 is energized to print a record of those slugs disposed in printing position. Power is applied to the key buttons and to the push button lock solenoid 121. Push buttons 18j through 18t are depressible in accordance with the amounts of the individual tolls to be collected by vehicles utilizing the toll facilities. Release key 18i may be actuated to manually release any of those depressed push buttons in the group 18j through 18t prior to the depression of a classification push button. Push button 18i is provided to permit correction of the accidental or erroneous depression of push buttons in the group 18j through 18t without registering the relative value of said push buttons. Keys 18j through 18t merely prepare circuits and it is not until one of the vehicle classification push buttons 18a through 18h, is depressed will the values of the depressed push buttons be registered.

In operation, a push button in the group 18l through 18t is depressed in accordance with the amount of toll to be collected. If necessary the independently operable push buttons 18j or 18k may also be depressed. This merely prepares the register booth for operation and nothing occurs with the depression of the amount push buttons. Actuation of the classification button appertaining to the particular vehicle paying the toll, actuates the toll registering equipment to register values of the push buttons depressed in the group 18j through 18k.

Further, there is provided an independently depressible charge or credit button 18a which is depressed when a charge or credit transaction occurs. Said charge button is depressed prior to the depression of a classification button and is non-operative until one of said classification buttons is actuated.

It will be noted that solenoid 121a prevents actuation of a classification button until at least one of the amount push buttons has been depressed.

Further, actuation or depression of a classification push button initiates a timing cycle of timing unit 25. Timing unit 25 effectively controls during the cycle thereof pulsing unit 26 and counting device 305. A count is maintained of each actuation of the respective classification push button thus a correlation of the amounts recorded by counters 314, 328 and 312 is established with the classification of vehicles paying such amounts.

Thus, it will be seen that there is provided a toll checking system in which the several objects of this invention are achieved and which is adapted to meet the condition of practical use.

The invention claimed is:

1. In combination, electrically operated counting means, a circuit for said counting means to make a predetermined count thereon when said circuit is energized, an amount key actuable to set up said circuit, an actuable classification key, means controlled by the actuation of said classification key after actuation of said amount key to energize said set-up circuit to operate said counter, means to hold said keys in actuated condition, cyclicly operable timing means to automatically release both keys a predetermined time after the actuation of said classification key, said counting means including a plurality of counters of successive order, means to carry over from the count of one order to the count of the next higher order, and means controlled by the release of said keys to actuate said carryover means.

2. In combination, electrically operated counting means, a circuit for said counting means to make a predetermined count thereon when said circuit is energized, an amount key actuable to set up said circuit, an actuable classification key, means controlled by the actuation of said classification key after actuation of said amount key to energize said set-up circuit to operate said counter, a second amount key, a second circuit to operate said counting means a different predetermined amount when said second circuit is energized, means to set up said second circuit upon actuating said second amount key, timing means, and means controlled by said timing means to prevent actuation of the second amount key after actuation of said first amount key until said classification key has been actuated and released.

3. In combination, electrically operated counting means, a plurality of amount keys, circuits controlled by the respective amount keys for making different predetermined counts on the counting means when said circuits are energized, a plurality of classification keys, a classification counter for each classification key, means controlled by each amount key to set up its circuit upon actuating the key, means controlled by the actuation of any one of the classification keys after actuation of one of said amount keys to energize the circuit for the actuated amount key, means controlled by the actuation of any classification key for actuating the classification counter associated therewith, timing means, means controlled by said timing means to automatically release the actuated amount key and actuated classification key a predetermined time after actuating the classification key, and means to prevent actuation of any other key during the predetermined period of time.

4. In combination, electrically operated counting means, a plurality of amount keys, circuits controlled by the respective amount keys for making different predetermined counts on the counting means when said circuits are energized, a plurality of classification keys, a classification counter for each classification key, means controlled by each amount key to set up its circuit upon actuating the key, means controlled by the actuation of any one of the classification keys after actuation of one of said amount keys to energize the circuit for the actuated amount key, means controlled by the actuation of any classification key for actuating the classification counter associated therewith, electromotive timing means, means controlled by said timing means to automatically release the actuated amount key and actuated classification key a predetermined time after actuating the classification key, and means to prevent actuation of an amount key after another amount key has been actuated, until a classification key has also been actuated and released by said timing means.

5. In combination, an electrically operated counting means, a plurality of amount keys of one class, an amount key of a second class, circuits connecting the respective amount keys of the first and second class with the counting means for operating the counting means different predetermined amounts upon energizing said amount keys, a plurality of classification keys, a classification counter associated with each classification key, means to set up each circuit upon actuating its respective amount key, means controlled by actuation of any one of the classification keys after actuation of an amount key for energizing the circuit for the amount key, means controlled by the actuation of any classification key for actuating the classification counter associated therewith, cyclicly operated timing means, interlocking means to prevent actuation of an amount key of the first class after another amount key of the first class has been actuated, until a classification key has been actuated, and means to prevent actuation of an amount key of another class until the actuated classification key has returned to deactuated position and said timing means has completed a predetermined portion of a cycle of operation.

6. In combination, an electrically operated counting means, a plurality of amount keys of one class, an amount key of a second class, circuits connecting the respective amount keys of the first and second class with the counting means for operating the counting means different predetermined amounts upon actuating said amount keys, a plurality of classification keys, a classification counter associated with each classification key, means to set up each circuit upon actuating its respective amount key, means controlled by actuation of any one of the classification keys after actuation of an amount key for energizing the circuit for the amount key, means controlled by the actuation of any classification key for actuating the classification counter associated therewith, means to prevent actuation of an amount key of the first class after another amount key of the first class has been actuated, until a classification key has been actuated, means controlled by the actuation of an amount key of the second class and an amount key of the first class to set up the circuits for both said keys, means to cause the circuits for said actuated amount keys of the first and second class to be energized upon thereafter actuating one of the classification keys, to cause the counter means to be actuated to make a count equivalent to the added predetermined amounts for said actuated amount keys of said first and second class, timing means, and means controlled by said timing means to release all the actuated keys a predetermined time after the actuation of the classification key, and means to prevent actuation of any other key during said predetermined period of time.

7. In combination, an electrically operated counting means, a plurality of amount keys of one class, an amount key of a second class, circuits connecting the respective amount keys of the first and second class with the counting means for operating the counting means different predetermined amounts upon actuating said amount keys, a plurality of classification keys, a classification counter associated with each classification key, means to set up each circuit upon actuating its respective amount key, means controlled by actuation of any one of the classification keys after actuation of an amount key for energizing the circuit for the amount key, means controlled by the actuation of any classification key for actuating the classification counter associated therewith, means to prevent actuation of an amount key of the first class after another amount key of the first class has been actuated, until a classification key has been actuated, means controlled by the actuation of an amount key of the second class and an amount key of the first class to set up the circuits for both said keys, means to cause the circuits for said actuated amount keys of the first and second class to be energized upon thereafter actuating one of the classification keys, to cause the counter means to be actuated to make a count equivalent to the added predetermined amounts for said actuated amount keys of said first and second class, timing means, means controlled by said timing means to release all the actuated keys a predetermined time after the actuation of the classification key, means to lock all the unactuated keys against actuation during said predetermined time, and means controlled by said timing means to release said locking means after said actuated keys have been released.

8. In combination, an electrically operated counting means, a plurality of amount keys of one class, an amount key of a second class, an amount key of a third class, circuits connecting the representative amount keys of the first, second and third class with the counting means for operating the counting means differing predetermined amounts upon actuating said amount keys, means interlocking the plurality of amount keys of said first class to prevent actuation of more than one of said keys, a plurality of classification keys, means interlocking said plurality of classification keys to prevent actuation of more than one of said keys, means to set up each circuit upon actuating its respective amount key, means controlled by the actuation of any one of the classification keys after actuation of an amount key for energizing the circuit for the amount key, and mechanical interlocking means to prevent actuation of any one of said plurality of classification keys until at least one amount key if the first, second or third class has been actuated.

9. In combination, an electrically operated counting means, a plurality of amount keys of one class, an amount key of a second class, an amount key of a third class, circuits connecting the representative amount keys of the first, second and third class with the counting means for operating the counting means differing predetermined amounts upon actuating said amount keys, means interlocking the plurality of amount keys of said first class to prevent actuation of more than one of said keys, a plurality of classification keys, means interlocking said plurality of classification keys to prevent actuation of more than one of said keys, means to set up each circuit upon actuating its respective amount key, means controlled by the actuation of any one of the classification keys after actuation of an amount key for energizing the circuit for the amount key, means to prevent actuation of any one of said plurality of classification keys until at least one amount key of the first, second or third class has been actuated, means to retain those keys actuated in actuated condition, timing means, and means controlled by said timing means to release said key retaining means a predetermined time after the actuation of one of said classification keys.

10. In combination, electrically operated counting means, a plurality of amount keys, circuits controlled by the respective amount keys for making different predetermined counts on the counting means when said circuits are energized, a plurality of classification keys, a classification counter for each classification key, means controlled by each amount key to set up its circuit upon actuating the key, means controlled by the actuation of any one of the classification keys after actuation of one of said amount keys to energize the circuit for the actuated amount key, means controlled by the actuation of any classification key for actuating the classification counter associated therewith, timing means, means controlled by said timing means to automatically release the actuated amount key and actuated classification key a predetermined time after actuating the classification key, and means to return said release keys to their respective unactuated positions.

References Cited in the file of this patent
UNITED STATES PATENTS

| | | |
|---|---|---|
| 1,744,771 | Julius | Jan. 28, 1930 |
| 2,086,605 | Cooper | July 13, 1937 |
| 2,335,122 | Julius et al. | Nov. 23, 1943 |
| 2,344,377 | Vigborg | Mar. 14, 1944 |
| 2,351,405 | Cooper | June 13, 1944 |
| 2,432,324 | May | Dec. 9, 1947 |
| 2,436,790 | Cooper | Mar. 2, 1948 |
| 2,479,681 | Handley | Aug. 23, 1949 |
| 2,528,394 | Sharpless et al. | Oct. 31, 1950 |
| 2,586,420 | Ellerbeck | Feb. 19, 1952 |
| 2,601,949 | Handley | July 1, 1952 |